(12) United States Patent
Will et al.

(10) Patent No.: US 9,087,230 B2
(45) Date of Patent: Jul. 21, 2015

(54) METHOD FOR COMMUNICATING BY A DETECTOR OF THE PRESENCE OF CHIP CARDS IN A READER CHIP CARDS AND A READING DEVICE COMMUNICATING BY THE PRESENCE DETECTOR

(75) Inventors: Patrick Will, Acigne (FR); Olivier Horr, Rennes (FR); Philippe Launay, Rennes (FR)

(73) Assignee: THOMSON LICENSING, Boulogne-Billancourt (FR)

(*) Notice: Subject to any disclaimer, the term of this patent is extended or adjusted under 35 U.S.C. 154(b) by 899 days.

(21) Appl. No.: 11/794,858

(22) PCT Filed: Dec. 22, 2005

(86) PCT No.: PCT/EP2005/057115
§ 371 (c)(1),
(2), (4) Date: Jul. 5, 2007

(87) PCT Pub. No.: WO2006/072552
PCT Pub. Date: Jul. 13, 2006

(65) Prior Publication Data
US 2008/0093452 A1    Apr. 24, 2008

(30) Foreign Application Priority Data

Jan. 7, 2005  (FR) .................................. 05 50063
Jan. 10, 2005 (FR) .................................. 05 50088

(51) Int. Cl.
*G06K 19/06* (2006.01)
*G06K 7/00* (2006.01)
(Continued)

(52) U.S. Cl.
CPC ............ *G06K 7/0021* (2013.01); *G06K 7/0047* (2013.01); *G06K 19/072* (2013.01); *G06K 19/07732* (2013.01); *G06K 19/07733* (2013.01); *G06K 19/07743* (2013.01)

(58) Field of Classification Search
USPC ......................................................... 235/492
See application file for complete search history.

(56) References Cited

U.S. PATENT DOCUMENTS 5,206,495 A     4/1993   Kreft
5,838,059 A  *  11/1998  Inoue et al. .................... 257/679
(Continued)

FOREIGN PATENT DOCUMENTS

CN    2424494    3/2001
DE    19542262   5/1996
(Continued)

OTHER PUBLICATIONS

Search Report Dated Jun. 9, 2006.
(Continued)

*Primary Examiner* — Christopher Stanford
(74) *Attorney, Agent, or Firm* — Tutunjian & Bitetto, P.C.

(57) ABSTRACT

The invention relates to a method of switching communication channels enabling a card reader to communicate with several card circuits, each circuit having a communication channel. The reader applies a power supply voltage to the card by electrical contacts arranged on a connection button. The reader transmits a control signal for controlling the switching of the communication channel to an electrical contact located in the inserted part of the card but not on the button. Finally, the reader sets up activation signals for at least one circuit to enable said circuit to communicate via the connection button. The invention also relates to a removable device and a receiver for reading said device.

3 Claims, 6 Drawing Sheets

Figure 1:
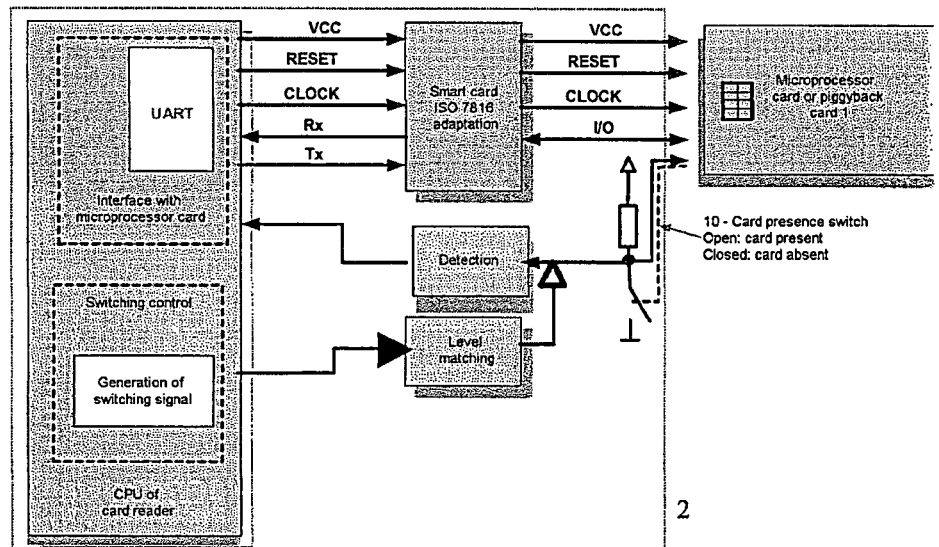

(51) Int. Cl.
  *G06K 19/07*      (2006.01)
  *G06K 19/077*     (2006.01)

(56) References Cited

U.S. PATENT DOCUMENTS

| | | | |
|---|---|---|---|
| 5,912,618 A | 6/1999 | Maugars | |
| 6,202,927 B1 * | 3/2001 | Bashan et al. | 235/451 |
| 6,216,955 B1 | 4/2001 | Le Roux et al. | |
| 6,439,464 B1 * | 8/2002 | Fruhauf et al. | 235/492 |
| 2002/0113119 A1 | 8/2002 | Bessel et al. | |
| 2003/0048380 A1 | 3/2003 | Tamura | |
| 2004/0093370 A1 | 5/2004 | Blair et al. | |

FOREIGN PATENT DOCUMENTS

| | | |
|---|---|---|
| DE | 10007710 | 8/2001 |
| EP | 0203683 | 12/1986 |
| EP | 0424726 | 5/1991 |
| EP | 0858046 | 8/1998 |
| EP | 1231785 | 8/2002 |
| EP | 1392053 | 2/2004 |
| JP | 3071327 | 6/2000 |
| JP | 2002544630 | 12/2002 |
| JP | 2003162368 | 6/2003 |
| KR | 2004005237 | 1/2004 |
| WO | WO 98/14916 | 4/1998 |
| WO | WO0070554 | 11/2000 |
| WO | W00106783 | 1/2001 |
| WO | W00161991 | 8/2001 |

OTHER PUBLICATIONS

International Standard, ISO/IEC, 7816-1, First Edition, Oct. 15, 1998, 17 Pages.
International Standard, ISO/IEC, 7816-2, First Edition, Mar. 1, 1999, Amendment Jun. 1, 2004, 17 Pages.
International Standard, ISO/IEC, 7816-3, First Edition, Nov. 1, 2006, 58 Pages.

* cited by examiner

METHOD FOR COMMUNICATING BY A DETECTOR OF THE PRESENCE OF CHIP CARDS IN A READER CHIP CARDS AND A READING DEVICE COMMUNICATING BY THE PRESENCE DETECTOR

This application claims the benefit, under 35 U.S.C. §365 of International Application PCT/EP2005/057115, filed Dec. 22, 2005, which was published in accordance with PCT Article 21(2) on Jul. 13, 2006 in French and which claims the benefit of French patent application No. 0550063, filed Jan. 7, 2005 and of French patent application No. 0550088, filed Jan. 10, 2005.

The present invention relates to a method of switching communication channels for chip card circuits, a chip card and a smartcard reader device for implementing the method.

These days, numerous devices contain a smartcard reader. Smartcards are objects normally associated with an individual or with a service and provided with integrated circuits, in particular for security purposes. The smartcards are used in mobile telephony to identify a subscriber, in banking to certify a payment and in television set-top boxes to authenticate the rights of a subscriber. Among the more common smartcards, microprocessor cards contain a central processing unit, a ROM memory containing an executable program, a working RAM memory and an EEPROM memory for permanently storing data. The microprocessor cards are connected to the reader via contact terminals, these terminals being used for the power supply, the Reset signal, the Clock signal for timing the microprocessor, and a bidirectional communication link called I/O. Another terminal called I/O2 is standardized and can be used for communication but is not currently used. The positioning of all the terminals, the nature of the electrical signals transmitted and the data exchanged by the I/O line are standardized in standard ISO 7816-1, 2 and 3, published by the ISO. Very generally, five terminals are used, only one of which is used to convey data bidirectionally.

The plastic card needs to be flexible enough to be kept in a pocket or a wallet, and the circuit incorporated in it needs to withstand a certain degree of bending. For this, the size of the single circuit is limited to around twenty square millimeters. Because of this, the performance is limited both in computation power and in memory space. These days, the smartcards are being used increasingly and there is a real need to increase performance. The performance levels can be increased by increasing the number of circuits in the smartcard. Such a solution has been adopted by several smartcard manufacturers who have implemented up to four circuits, each near one of the four corners of the smartcard. An appropriate screen printing enables the user to know the applications implemented in each of the circuits, so that he can insert the smartcard in the reader, the circuit that he wants powered being that placed under the terminal on the top side, at the righthand end of the smartcard when the smartcard is offered up to the reader input. In this way, the user has a single smartcard instead of four. This solution has the drawback that two circuits cannot communicate with the reader at the same time. To switch from one circuit to the other, the user has to remove the smartcard and insert it, changing the direction and/or changing the side. The user must therefore be constantly present to perform these operations, and in any case, this solution cannot be considered if two circuits of the smartcard need to communicate with each other.

Another method consists in providing the smartcard with contact communication for one circuit and contactless communication with another circuit. Circuits for smartcards that are connected to a coil embedded in the thickness of the smartcard are known. The coil provides both power supply and communication. However, the communication with one or other of the circuits entails equipping the reader with a connector and coils, being careful to ensure that the signals exchanged by a communication channel do not corrupt the signals exchanged with the other communication channel. Because of this, this solution is expensive and difficult to implement.

Microprocessor cards, called supersmart cards, which comprise an LCD screen, a keypad, an autonomous power supply means and a wireless communication channel in addition to the connection terminal by standardized electrical contact, are known. Such a microprocessor card is, for example, disclosed in patent EP 203 683 filed by VISA INTERNATIONAL. When a user inserts them in a reader, these smartcards dialog with a contact but access to the keypad is no longer possible. Outside the reader, these smartcards communicate by radio with a device. However, these smartcards are very fragile and costly, and have never been really marketed.

Television set-top boxes are used to receive signals originating from an antenna, decode these signals and send them to a television screen. A set-top box does not have many front panel buttons, normally fewer than five. Using a remote control, the user can remotely control changing channels, adjusting the sound, activating the program guide, and so on. Numerous adjustments, like the picture adjustments can be performed on the television screen, so that the remote control of the set-top box comprises few functions and therefore few keys. If, then, there is a desire to provide the set-top box with additional functions, the guide must be made more complex. Furthermore, in case of loss, the few front panel buttons on the set-top box allow only a minimum of functionality. The services provided by the set-top box are then very reduced. The present invention provides for novel means of communication with a device provided with a smartcard reader that are inexpensive and do not disrupt the normal progress of the exchanges with the smartcard.

The subject of the present invention is a method of switching communication channels enabling a smartcard reader to communicate with several circuits of the card inserted into the reader, each circuit having a communication channel; characterized in that it comprises the following steps:

- application of a power supply voltage to the card by electrical contacts arranged on a connection button,
- transmission by the reader of a control signal to control the switching of the communication channels to an electrical contact located in the inserted part of the card but not on the button,
- switching of a communication channel for a circuit enabling said circuit to communicate via the connection button.

In this way, the reader can select the circuit of the card that has been inserted with which it wants to communicate. By having the switching signal transmitted to an electrical contact located in the inserted part of the card but not to the button, it is possible not to use the terminals of the cards whose use is standardized.

According to a first refinement, the method comprises a step for detecting a signal on the electrical contact of the card indicating the presence of a switching unit. In this way, the reader recognizes whether the inserted card has one or several circuits and a switching means enabling dialog with each of them. According to another refinement, the control signal comprises a plurality of individual signals, the number of which determines the switching position. In this way, the switching is performed by counting these individual signals.

According to another refinement, the switching is also applied to the communication control signals such as Clock and Reset. This way, the reader can individually activate each circuit.

The subject of the invention is also a removable device designed to be inserted into a smartcard reader, comprising a first part that is inserted into the reader comprising an electrical connection button; characterized in that it comprises a second part accessible from outside the reader comprising: a plurality of circuits designed to transmit data outside of said reader, the communication with the plurality of circuits being managed by a management unit using signals transmitted by the connection button and communicating with the reader via an electrical contact located in the inserted part of the device but not on the connection button.

According to a first refinement, the device comprises a means of transmitting a signal to the electrical contact indicating the presence of the switching circuit. In this way, the card can externally transmit the indication as to whether or not it is provided with a switching circuit. According to another refinement, the switching circuit comprises at least one second circuit for switching control signals such as Clock and Reset. In this way, the circuits present on the card can be activated individually.

According to another refinement, the device comprises a number of recesses for inserting smartcards. The recesses are provided with connectors for communication with an inserted smartcard. The I/O pin of each connector being connected to a switching terminal of the switching circuit. In this way, the device enables communication between a reader and several smartcards. According to a refinement, each of these recesses comprises a detector for detecting a card. A management circuit processing the signals originating from the detectors and transmitting the information processed via a terminal of the connection button.

According to another refinement, the device comprises a means of entering commands and/or display means, a position of the switch enabling communication between the terminal (I/O) of the button and said entry and/or display means. In this way, the device can be used as a communication interface with the user. According to another refinement, the position of the electrical contact characterizes device categories. In this way, pairs of readers and cards that cooperate solely with each other can be defined.

The subject of the invention is also a smartcard reader device having a recess comprising a connector provided with electrical contacts cooperating with the terminals of a connection button on a card inserted into said recess, and a card presence detector, the voltage of which varies when a card is inserted; characterized in that said detector has a metallic part designed to come into contact with a metallic part of the inserted card, and in that the device comprises a communication means transmitting data via the card presence detector.

Figure 3:
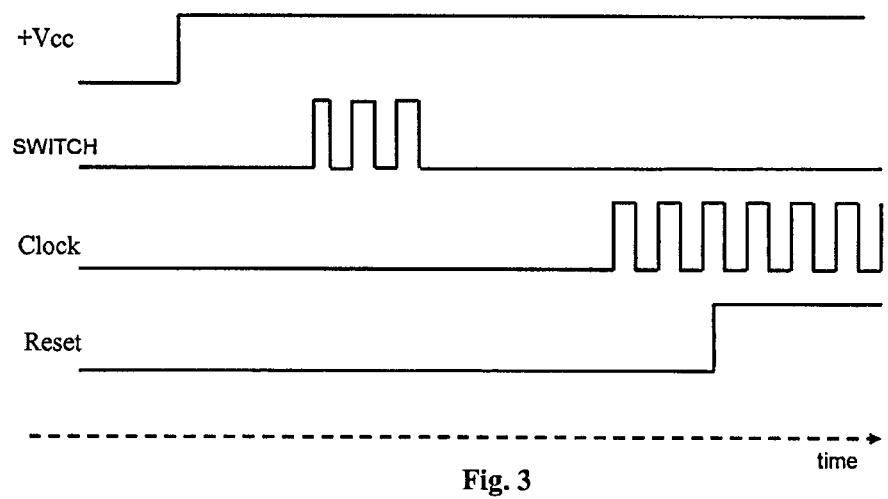
Figure 2:
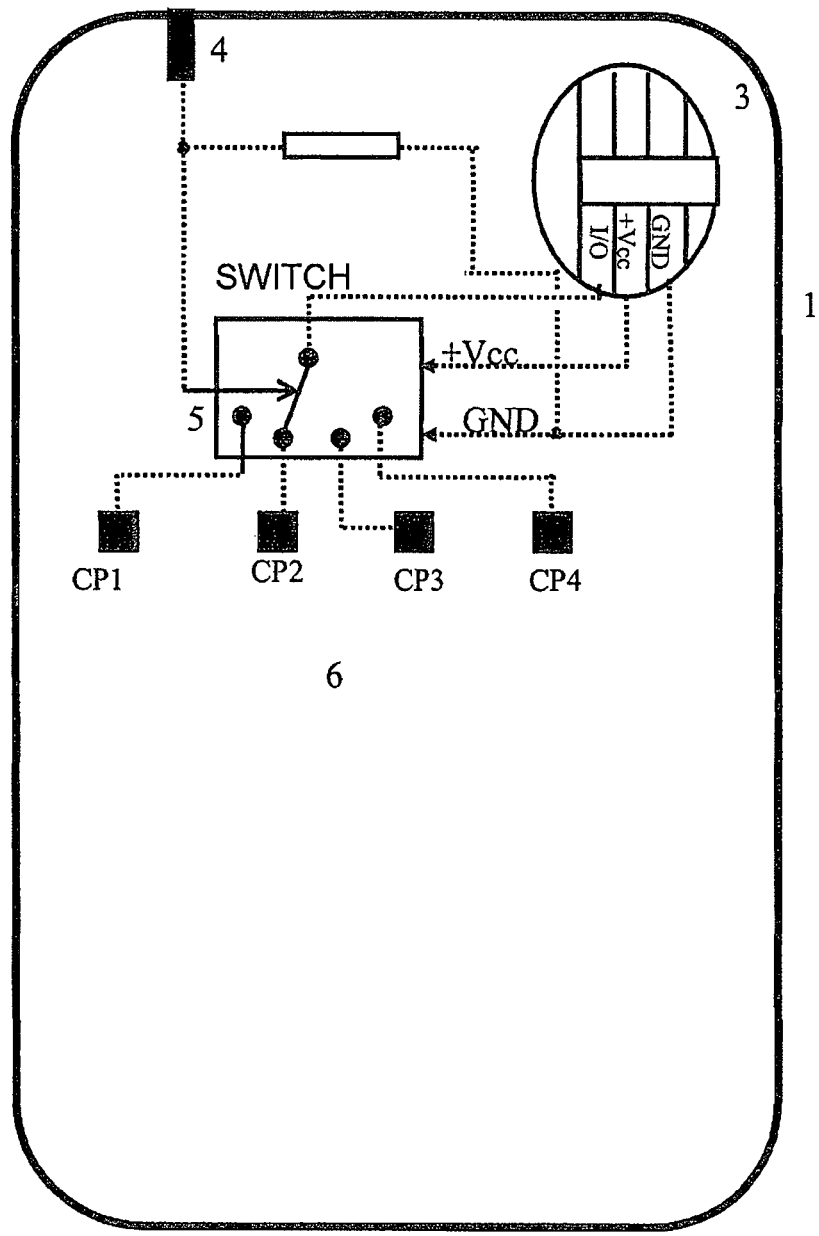
Figure 4:
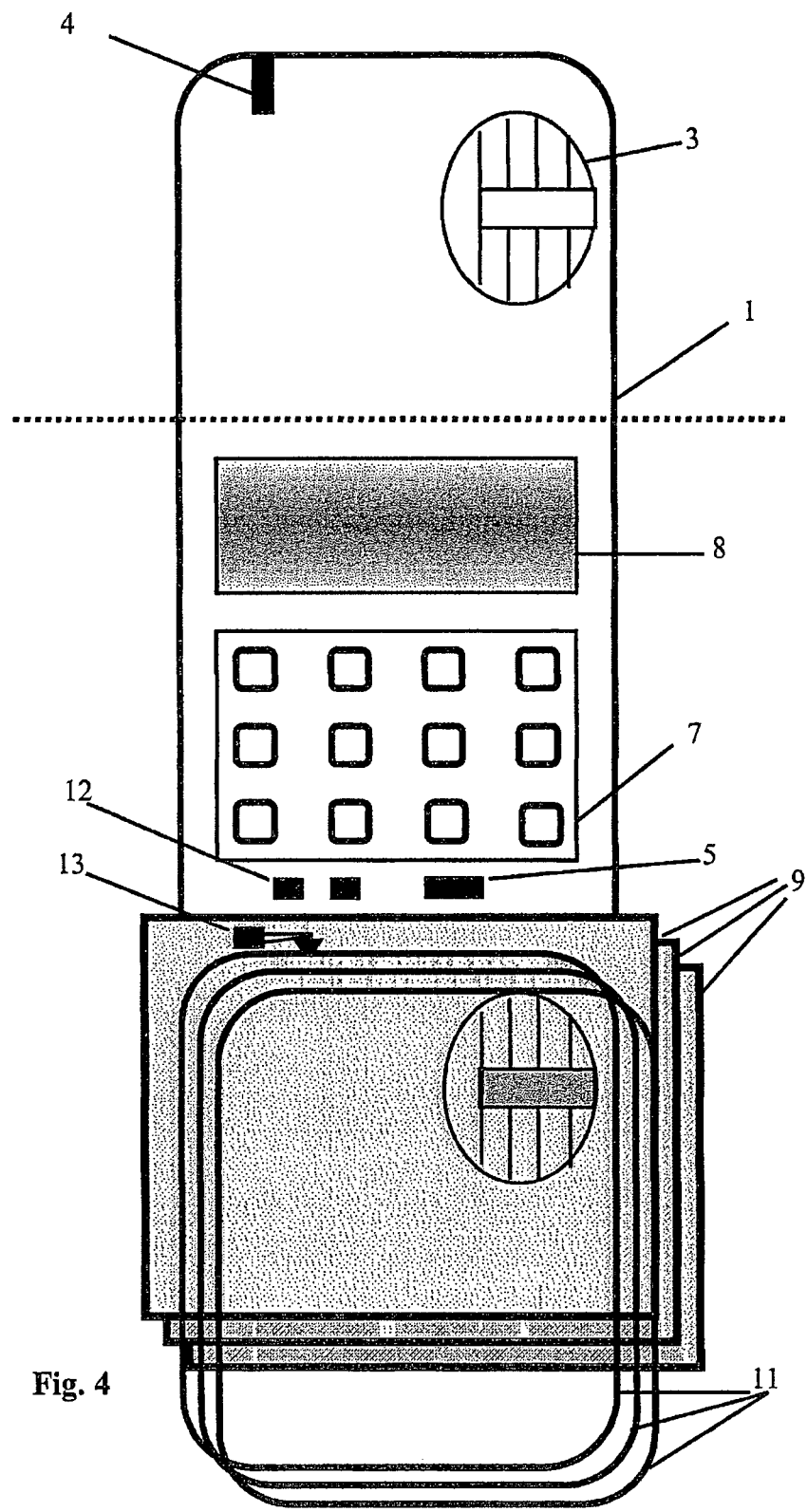
Figure 5:
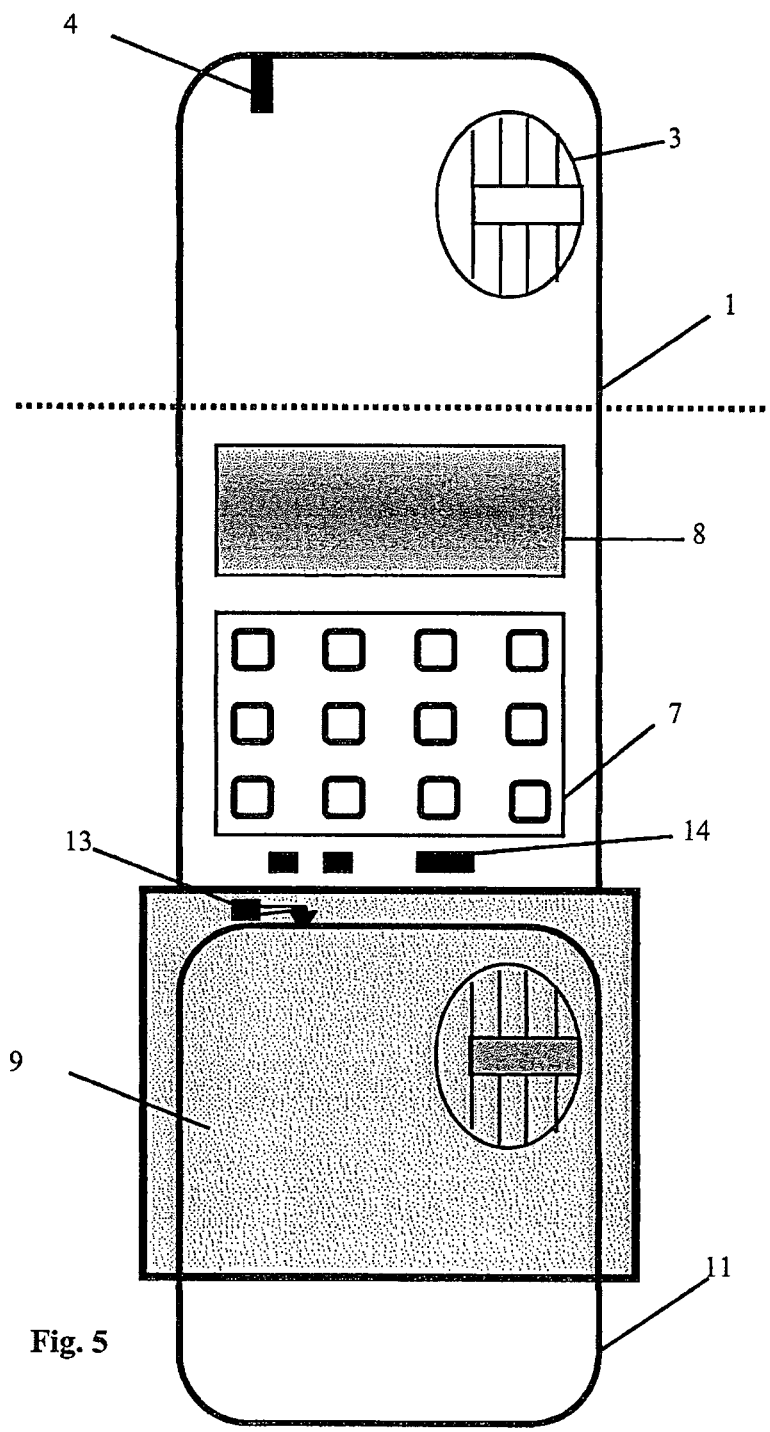
Figure 6:
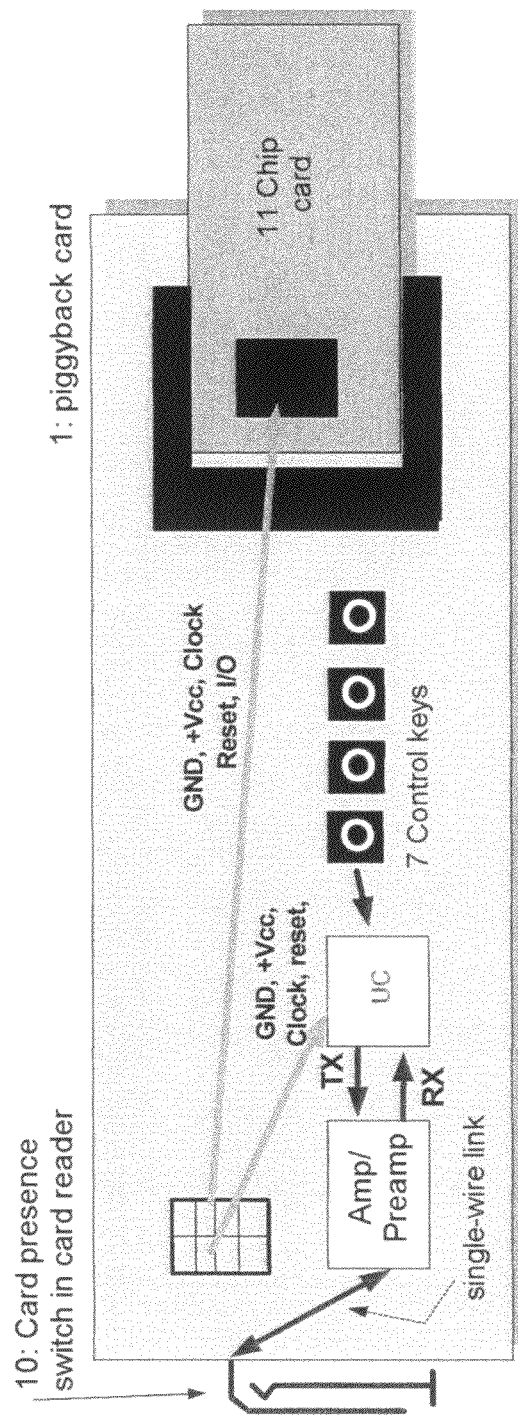
Figure 7:
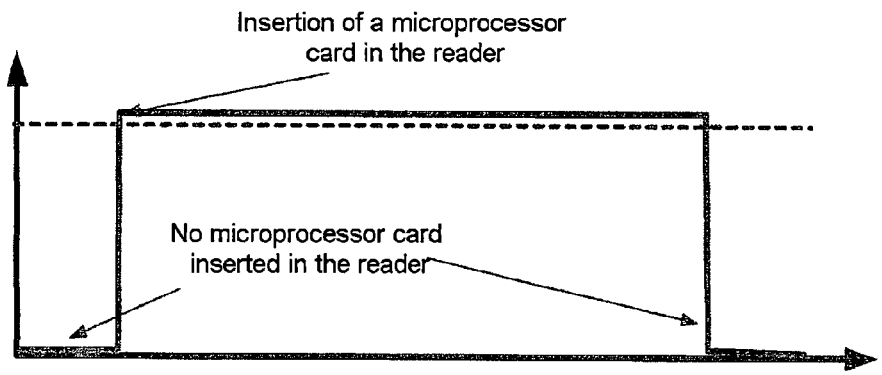
Figure 8:
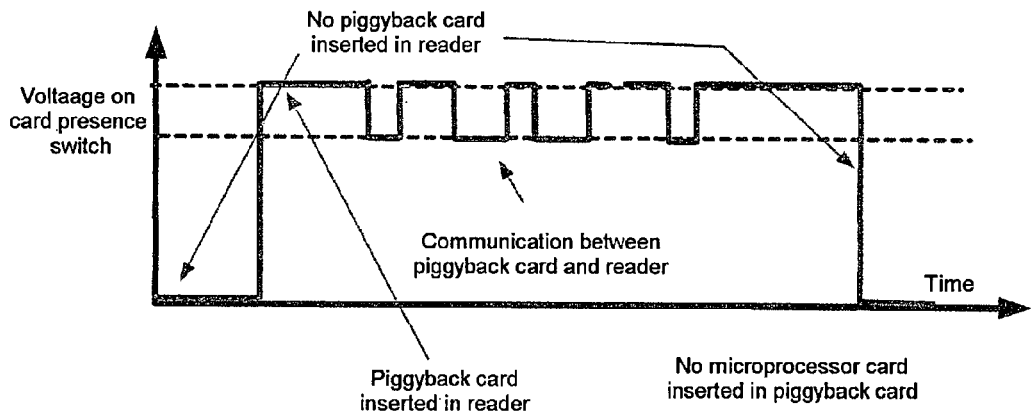
Figure 9:
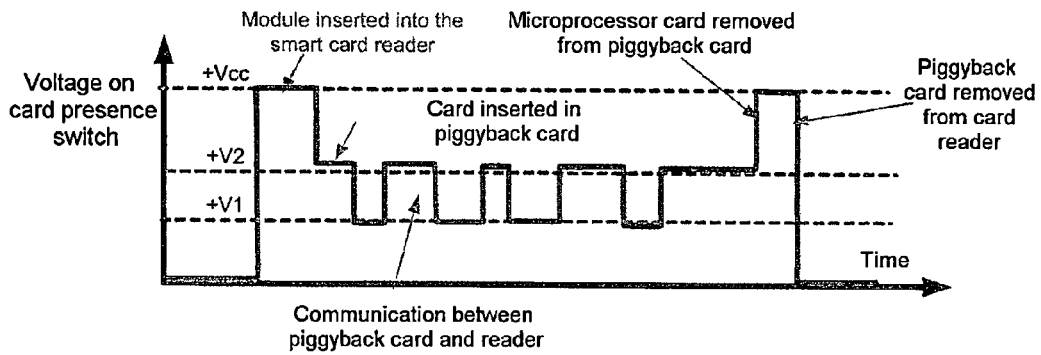

The invention, with its characteristics and advantages, will become more clearly apparent from reading the description of a particular and nonlimiting exemplary embodiment, with reference to the appended drawings in which:

FIG. 1 is a block diagram of a reader showing the main connections with a chip card according to a preferred exemplary embodiment, FIG. 2 diagrammatically shows an exemplary embodiment of the card according to the invention, FIG. 3 is a timing diagram showing the trend of the main signals exchanged when a card is powered up according to one exemplary embodiment, FIG. 4 is a diagram of a piggyback card, according to a variant of one exemplary embodiment, FIG. 5 diagrammatically shows an exemplary embodiment of the piggyback card, FIG. 6 diagrammatically shows an exemplary embodiment of the piggyback card, showing the main electrical links, FIG. 7 is a time diagram showing the trend of the detecting signal on the card presence switch when a conventional microprocessor card is inserted, FIG. 8 is a time diagram showing the trend of the detecting signal on the card presence switch when a piggyback card is inserted without a chip card being inserted into the recess, FIG. 9 is a time diagram showing the trend of the electrical signal when a piggyback card is inserted and then when a chip card is inserted into the recess.

FIG. 1 is a block diagram of a reader 2 showing the main connections with a smartcard 1. The reader 2 has a slot which gives access to a recess containing a set of connectors cooperating with the terminals of the card when said card is fully inserted into the recess.

The chip card 1 has a connection button equipped with terminals standardized according to ISO 7816-3. There are:
GND and +Vcc: electrical power supply (5 volts or 3 volts),
Reset: microprocessor reset signal,
Clock: clock signal for timing the microprocessor,
Vpp: voltage (21 to 25 Volts) for EPROM cards (not used),
I/O: bidirectional data transfer line,
AUX1, AUX2: signals used for NDS-type security cards.

Since the connectors cooperating with the button are normally sliding contacts, and the terminals are positioned on two rows, it would be destructive to the microprocessor for the electrical signals to be applied to the terminals when the card is being inserted. A card presence switch 10 placed at the back of the recess detects when the card is fully inserted. The signal transmitted by the switch 10 triggers the activation of the +Vcc, Clock and Reset signals in a precise order, specified by the ISO 7816-3 standard. Following this, the card's microprocessor is activated and transmits the "Response to Reset" over the I/O line. Other protocols can be considered, in particular for synchronous cards.

In a particularly economical and widely-used manner, the card presence switch 10 comprises two metal blades which, in the absence of a card, are in electrical contact. When a card is fully inserted, its edge folds one of the blades which breaks the contact with the other blade. The blade in contact with the card is electrically linked to a "pull-up" resistor connected to the +Vcc of the reader and to a formatting circuit for detecting electrical levels for them to be processed by the smartcard reader's central processing unit. The disappearance of a GND level (0 volts) is the indication that a card is present. The level detected indicates if it is a card with or without electrical contact cooperating with the switch 10. Immediately the card is removed from the reader, the blade returns into contact with the other blade which is linked to the GND, that is, electrical zero. In the absence of a card, the signal generated is 0 volts.

FIG. 2 shows a card 1 according to a first preferred exemplary embodiment. The card is equipped with a button 3 comprising connection terminals according to the ISO 7816 standard. A 2.5 mm metallic strip 4 is positioned on the edge of the card so as to come into contact with the card presence switch at the back of the recess of a smartcard reader. The card also has several integrated circuits, including microprocessors 6, called CP1, CP2, CP3 and CP4, and a four-position switch circuit called SWITCH. Each microprocessor 6 has an I/O line for unidirectional or bidirectional communication. The GND, +Vcc, RESET and Clock signals power all the central processing units. The I/O line from the terminal is linked to the switch SWITCH, as are the various communication lines I/0i from the microprocessors 6 CP1, CP2, CP3, etc. The switch has as many positions as there are circuits 6 with which the reader can communicate. According to a first exemplary embodiment, the switching signal that makes it possible to select the line I/Oi communicating with the reader is supplied by the additional contact 4 which is not on the OSI-standardized terminal. The additional contact 4 is electrically linked to the control input of the switch SWITCH.

According to a refinement not shown in FIG. 2, the switch SWITCH has a triple switching circuit, which makes it possible to switch the Clock and Reset lines as well as the I/O line. Because of this, the Clock and Reset pins are no longer connected to the terminals of the button 4 as previously, but linked to the second and third terminals of the second and third circuits of the switch 5. In order to keep the electrical levels constant, all the electrical levels of the Clock and Reset pins of the circuits 6 are held at 0 volts by a resistor. With this refinement, the reader can separately activate each circuit 6.

Having detailed the various elements, we will now describe how said elements cooperate with the help of the timing diagram of FIG. 3.

The reader's central processing unit permanently analyzes the electrical level present on the card presence switch 10. If the card has no electrical contact, the voltage detected on the card presence switch is +Vcc. The card is then powered up in the conventional way. If the voltage detected on the card presence switch is an intermediate voltage, 2.5 volts for example, this means that there is an electrical current passing through the reader's pull-up resistor and a resistor implemented on the card. Then, the reader's central processing unit applies the power supply voltage +VCC to the terminal of the card 1. At this moment, the switch SWITCH is powered, its default position on power up is to connect I/O1 of the circuit CP1 with the I/O terminal of the button. If the reader wishes to dialog with the circuit CP1, it does not need to send a switching signal. If the reader wishes to dialog with another microprocessor, then it sends to the card presence switch 10 a sequence made up of a determined number of pulses. On each pulse, the switch changes position: after two I/O pulses the terminal is linked to I/O2 of CP2, after three: I/O3 of CP3, and so on. Thanks to the use of a metallic card presence switch, the transmission of a communication channel switching signal does not require the hardware characteristics of the reader to be modified.

A variant of embodiment of this first exemplary embodiment consists in applying a determined voltage to the card presence switch 10. The position of the switch depends directly on the value of the voltage applied. For example, if the voltage is between 1 and 2 volts, the switch electrically links I/O1 of circuit CP1 with the I/O terminal of the button. If the voltage is between 2 and 3 volts, the switch electrically links I/O2 of the circuit CP2 with the I/O terminal of the button, between 3 and 4 volts, I/O3 of circuit CP3 and between 4 and 5 volts, I/O4 of circuit CP4. This variant has the advantage that the application of a new voltage immediately alters the position of the switch.

A refinement of this first exemplary embodiment consists of the card inserted in the reader being a piggyback card comprising an interface with the user and several connectors for communication with several chip cards.

Another exemplary embodiment of the piggyback card is shown diagrammatically by FIG. 4. The piggyback card, which has the same reference 1 as the card described in FIG. 3, is made up of an epoxy wafer having the same thickness as a microprocessor card (0.9 mm). A first difference is that all or some of the microprocessors 6 are replaced by chip cards 11. The limit of the part inserted into the reader is represented by a broken line. The button 3 supports the ISO 7816 standardized connections. A 2.5 mm metallic strip 4 fixed on the edge of the card is applied to the card presence switch at the back of the smartcard reader's recess. The piggyback card has a first part which is inserted into the reader and a second which remains accessible to the user. The limit between the two parts is represented by a broken line in FIG. 3. This second part comprises a keypad 7 with keys that can be accessed by a user, a display 8 and three recesses 9 stacked one on top of the other enabling a maximum of three microprocessor cards 11 to be inserted. The terminals GND, +Vcc, RESET and Clock of the button 3 are electrically linked to the corresponding terminals of the three connectors inside the three recesses 9, such that these terminals are electrically linked to the corresponding terminals of the cards 11 inserted into the recesses 9. The I/O line of the button 3 is linked to the switch SWITCH 5, and the I/O pins of the three connectors inside the three recesses. The switch 5 has four positions, the terminal corresponding to the first position is linked to a keypad management circuit 12, this circuit is advantageously a microcontroller. The other three terminals are each linked to the I/O pin of each of the three connectors inside the three recesses 9. The additional contact 4 is electrically linked to the control input of the switch SWITCH so that the switching signal transmitted by the reader selects the line I/Oi of the circuit with which it wants to communicate.

Each recess has a card presence switch 13. One terminal of the switch is linked to GND, the other to a resistor linked to +Vcc. In the absence of a card, the switch is closed and the voltage at its terminal is 0 volts. The appearance of a signal with a +Vcc level on the switch 13 indicates that a card is fully inserted into the recess 9. The three switches 13 are linked to the keypad management circuit 12. In this way, the management circuit receives the information if cards are inserted in the recesses and can supply it to the reader when said reader asks for it.

The piggyback card can also support audible transmission means such as a loudspeaker and a buzzer. The keypad management circuit 12 responsible for managing the keypad 7, the screen 8 and the presence of the cards 11 is preferably located outside of the insertion area in the reader, where there is no thickness constraint. This does not preclude it from being in the insertion area, provided that the maximum thickness of 0.9 mm is respected. The connection wires between the button 3, the electrical element 4, the switch 5, the management circuit 12 and the connectors of the recesses 9 are preferably implemented in the form of copper deposited on the epoxy wafer, the deposits are then covered with an insulating element. The piggyback card can also support a security module. A security module is a circuit of the same type as that of a microprocessor card, with additional security functions.

One use of the piggyback card consists in having the reader execute a telepurchasing application with the help of a pay transmission network. A first recess contains the exclusive transmission network access card, this card contains the rights to view audiovisual programs. A second recess is designed to receive a bank card. It makes it possible to pay for a selected object in a telepurchasing program.

As for the card described by FIG. 3, one refinement consists of the switch SWITCH having a triple switching circuit. In this way, the Clock and Reset pins of the connectors 9 are no longer connected to the corresponding terminals of the button 4 as previously, but electrically linked to the second and third circuits of the switch 5. In order to keep the electrical levels constant, all the electrical levels of the Clock and Reset pins of the connectors installed in each recess 9 are held to GND by a resistor. With this refinement, the reader can separately activate each card 11 inserted into each recess 9.

According to another refinement, the position of the electrical edge of the card and the position of the card presence switch are arranged in a predetermined location. The rectilinear part of the width of a card being 48 mm, it is possible to have an electrical edge every 3 mm, which makes 16 possible positions. Strictly speaking, to be able to perform the switching, the contact of the card must be facing the metallic part of the card presence switch. Otherwise, no electrical contact is made and the card will be treated conventionally. Using this refinement, pairs of readers cooperating solely with certain models of piggyback cards can be defined.

Another exemplary embodiment of the piggyback card is diagrammatically shown by FIG. 5. A first difference from the example illustrated by FIG. 4 consists of the switch 5 being replaced by a card management circuit 14, this circuit receiving communication data via the metallic strip 4. The button 3 supports the ISO 7816-standardized connections. A 2.5 mm metallic strip 4 is fixed to the edge of the card in the position that is applied to the card presence switch 10 when the card is fully inserted into the reader. The part of the piggyback card that remains accessible also has a recess 9 for inserting the microprocessor card 11. This recess has a card presence switch 13. This switch is linked on the one hand to the electrical contact 4 and on the other hand to a resistor connected to GND. When there is a card 11 in the recess 9, the switch 13 is closed such that the electrical level present on the electrical contact 4 is lowered to a certain value, typically 1.5 volts if +Vcc is equal to 5 volts.

ISO 7816-standardized contact elements in the recess and electrical lines linked to the terminals of the button 3 provide the electrical continuity between the inserted microprocessor card 11 and the button 3. In this way, the reader can read the chip card 11 as if it were directly inserted. The piggyback card 1 has a keypad 7 comprising keys, possibly screen printed. Other command acquisition or value entry elements (switch, mini-dip switches, potentiometer, decimal pad, etc.) are possible. According to a refinement, the piggyback card 1 also has a display 8, typically an LCD screen. The card 1 can also support audible transmission means such as a loudspeaker and a buzzer. The microcontroller 14 handling the management of the keypad 7, the screen 8 and the communication via the electrical element 4 is preferably located outside the insertion area in the reader, so there is no thickness constraint. This does not preclude it from being in the insertion area, provided that the maximum thickness of 0.9 mm is respected. The connection wires between the button 3, the electrical element 4, the microcontroller 14 and the connector in the recess 9 are implemented by copper deposition on the epoxy wafer, the wires being covered by an insulating element.

FIG. 6 shows the various electrical links between the electrical components of the piggyback card. The microcontroller 14 is linked to the terminals of the button 3 in order to provide its electrical power supply, the clock and the RESET signal, to the user interface elements 7 and 8 and to the metal element 4. A component between the microcontroller and the metallic element 4 may be needed for level matching and short circuit protection. If the link is bidirectional and if the microcontroller has two communication lines, said lines are then linked to two components for level matching and to provide a "half duplex" communication line.

We will now look at how the reader can detect the presence of the piggyback card according to this novel exemplary embodiment and the presence of a chip card in its recess. FIGS. 7, 8 and 9 are time diagrams describing the trend of the electrical signals present on the card presence switch and transmitted to the reader's management unit. FIG. 7 describes the insertion of a conventional microprocessor card. At the outset, the electrical level is 0 volts, which means that no card is inserted. Then the level rises to +Vcc indicating the insertion of a card. The level then remains at +Vcc which means that there is no piggyback card. Finally, the level drops back to "0" when the card is removed.

FIG. 8 describes the trend of the electrical signal when a piggyback card is inserted without a chip card being inserted in the recess. As for FIG. 7, the electrical level goes to +Vcc when the piggyback card is inserted, then the level oscillates between +Vcc and a value +V2 indicating that the microcontroller is transmitting data or, more generally, a communication is being set up between the reader and the microcontroller. In the simplified embodiment where the piggyback card contains only a keypad, the appearance of a +V2 level for a determined duration indicates the transmission of a start bit, the eight data bits are then transmitted in series. Advantageously, a parity bit and an end bit end the transmission of the data.

FIG. 9 describes the trend of the electrical signal when a piggyback card is inserted then a chip card is inserted into the recess. The electrical level goes to +Vcc when a piggyback card is inserted, then goes to +V2 when a chip card is inserted. The drop in voltage from +Vcc to +V2 is due to the closure of the card presence switch 13 and to the resistor connected to GND. The holding of the +V2 level for a long time (at least ten times longer than it takes to transmit a bit) indicates to the reader that a microprocessor card has just been inserted into the recess. When the reader detects such a transition to +V2, it knows that a chip card has been inserted in the recess and triggers a new reset. Following which, if everything goes well, it should receive the Reset bytes over the I/O link from the connection terminal. If the I/O line transmits no byte, the card is mute, either because of a security blockage, or because of a card malfunction. When the microcontroller communicates with the reader, the electrical levels oscillate between a maximum value of +V2 and a minimum value of +V1. When the voltage rises back to +Vcc, the reader knows that the microprocessor card has been removed.

In order to detect the various +Vcc, +V2 and +V1 thresholds, the blade in contact with the card is connected to threshold detectors. According to one simplified embodiment, the thresholds are set to three intermediate voltages $V_A$, $V_B$ and $V_C$. $V_A$ is an electrical level between 0 volt and +V1, $V_B$ is an electrical level between +V1 and +V2 and $V_C$ is an electrical level between +V2 and +Vcc. The comparators are cascaded so as to provide a binary value on two lines connected to the reader's management unit. The binary value of the two lines informs the coupler of the voltage value of the card presence switch. This analysis of the values is done by taking account of the voltages and signals applied to the ISO 7816 connection terminals. Initially, no voltage is applied. A "00" value transmitted by the comparators means that no card is inserted, otherwise a card is in the reader. In this latter case, the reader's management unit applies the signals to the connection terminal according to the 7816 standard. The output of the comparators then takes the following values: if "01" then the level is greater than $V_A$ and less than $V_B$ indicating that a piggyback card and a microprocessor card are in the reader and a bit at "0" is transmitted. If "10" then the level is greater than $V_B$ and less than $V_C$ indicating either that a piggyback card and a microprocessor card are in the reader and the link is idle or a bit at "1" being transmitted, or that a piggyback card without microprocessor card is in the reader and a bit at "0" is being transmitted. If "11" then the level is greater than $V_C$ indicating either the presence of a microprocessor card alone, or the presence of a piggyback card without microprocessor card and the link is idle or a bit at "1" is being transmitted. When the value of the comparators changes between "01" and "10" or between "10" and "11", then the reader can deduce from this the presence or otherwise of the piggyback card and the presence or otherwise of the microprocessor card.

According to the final exemplary embodiment, if the piggyback card has a signal transmission means, for example an LCD screen, or LED diodes, or even a buzzer, then the link with the microcontroller is bidirectional. In this way, the reader can receive the codes from the keys pressed and transmit information to be displayed.

According to another refinement of the last exemplary embodiment, the position of the electrical edge of the card and the position of the card presence switch are arranged in a determined location. The rectilinear part of the width of the card being 48 mm, it is possible to have an electrical edge every 3 mm, which makes 16 possible positions. Strictly speaking, to provide for communication, they must be facing each other, but this is not necessary to detect only the presence of a card. Because of this, different reader models cooperating with specific piggyback card models can be implemented.

The present embodiments should be considered as an illustration, but can be modified in the domain defined by the scope of the appended claims. In particular, other ways of detecting an electrical contact on a chip card can be envisaged without departing from the scope of the present invention. In particular, the invention is not limited to television set-top boxes but can be applied to any device having a microprocessor card reader.

The invention claimed is:

1. A method of switching communication channels enabling a smartcard reader to communicate with two or more circuits of the card inserted into the smartcard reader, each circuit having a communication channel, the method comprising:
   applying a power supply voltage to the card by electrical contacts arranged on a connection button, said connection button being defined according to ISO7816,
   transmitting by the smartcard reader of a control signal to control the switching of the communication channels on an electrical contact located on an edge surface of an inserted part of the smartcard, but not located on said standardized connection button,
   switching of a communication channel for a circuit among two or more circuits, enabling said circuit to communicate via said connection button and disabling other circuits of said two or more circuits to communicate via the connection button, so that it is possible to alternatively control one or more circuits through a smartcard connection button designed to interface a chip smartcard;
   wherein the method further comprises, before said application of said power supply voltage, detecting a presence of a switching unit on said card by a voltage measurement induced by an edge surface in said smart card reader, and if such presence detected, said card inserted in the smart card reader is determined to have two or more circuits.

2. The method according to claim 1; wherein the transmitted control signal comprises a plurality of individual signals, a number of a plurality of individual signals which determines the switching position.

3. The method according to claim 1; wherein the switching signal also switches communication control signals.

* * * * *